United States Patent [19]

Kurihara et al.

[11] 4,437,163
[45] Mar. 13, 1984

[54] METHOD AND APPARATUS FOR SYMPTOM DIAGNOSIS BY MONITORING VIBRATION OF SHAFT OF ROTARY MACHINE

[75] Inventors: Nobuo Kurihara, Hitachiota; Yasuo Morooka; Mitsuyo Nishikawa, both of Hitachi; Kiyoshi Miura, Ibaraki; Yoshitoshi Nagahashi, Hitachi, all of Japan

[73] Assignee: Hitachi, Ltd., Tokyo, Japan

[21] Appl. No.: 248,846

[22] Filed: Mar. 30, 1981

[30] Foreign Application Priority Data

Mar. 31, 1980 [JP] Japan .................................. 55-40322

[51] Int. Cl.³ ............................................ G01P 15/00
[52] U.S. Cl. ...................................... 364/508; 73/593
[58] Field of Search .................. 364/508, 474; 73/570, 73/579, 593, 658, 660, 462

[56] References Cited

U.S. PATENT DOCUMENTS

| | | | |
|---|---|---|---|
| 3,694,637 | 9/1972 | Edwin et al. | 364/508 |
| 3,841,149 | 10/1974 | Edwin et al. | 364/508 X |
| 4,007,630 | 2/1977 | Noda | 73/593 |
| 4,010,637 | 3/1977 | Harwell et al. | 73/658 |
| 4,078,434 | 3/1978 | Weberhofer | 73/579 X |
| 4,135,244 | 1/1979 | Davis | 364/508 |
| 4,261,206 | 4/1981 | Futakawa et al. | 73/593 X |
| 4,262,538 | 4/1981 | Otawara | 73/593 |
| 4,302,813 | 11/1981 | Kurihara et al. | 364/508 |
| 4,335,600 | 6/1982 | Wu et al. | 73/660 X |

OTHER PUBLICATIONS

Measure Machine Vibration, Kaufman, Instruments & Control Systems Feb. 1975, pp. 59–62.

Primary Examiner—Edward J. Wise
Attorney, Agent, or Firm—Antonelli, Terry & Wands

[57] ABSTRACT

A method of symptom diagnosis by continuously detecting vibration of the shaft of a rotary machine and monitoring a signal indicative of detected shaft vibration for the diagnosis of the operating condition of the rotary machine. In the method, a symptom of unusual operation of the rotary machine is diagnosed. The rotation speed range of the rotary machine is classified into a safety region, an alarm region and a trip region depending on the level of the shaft vibration signal. According to the disclosed method, symptom diagnostic regions are established within the safety region at time intervals of a symptom diagnostic period, and whether or not the level of the detected shaft vibration signal deviates from that of the symptom diagnostic regions is continuously monitored for the diagnosis of a symptom of unusual operation of the rotary machine.

21 Claims, 28 Drawing Figures

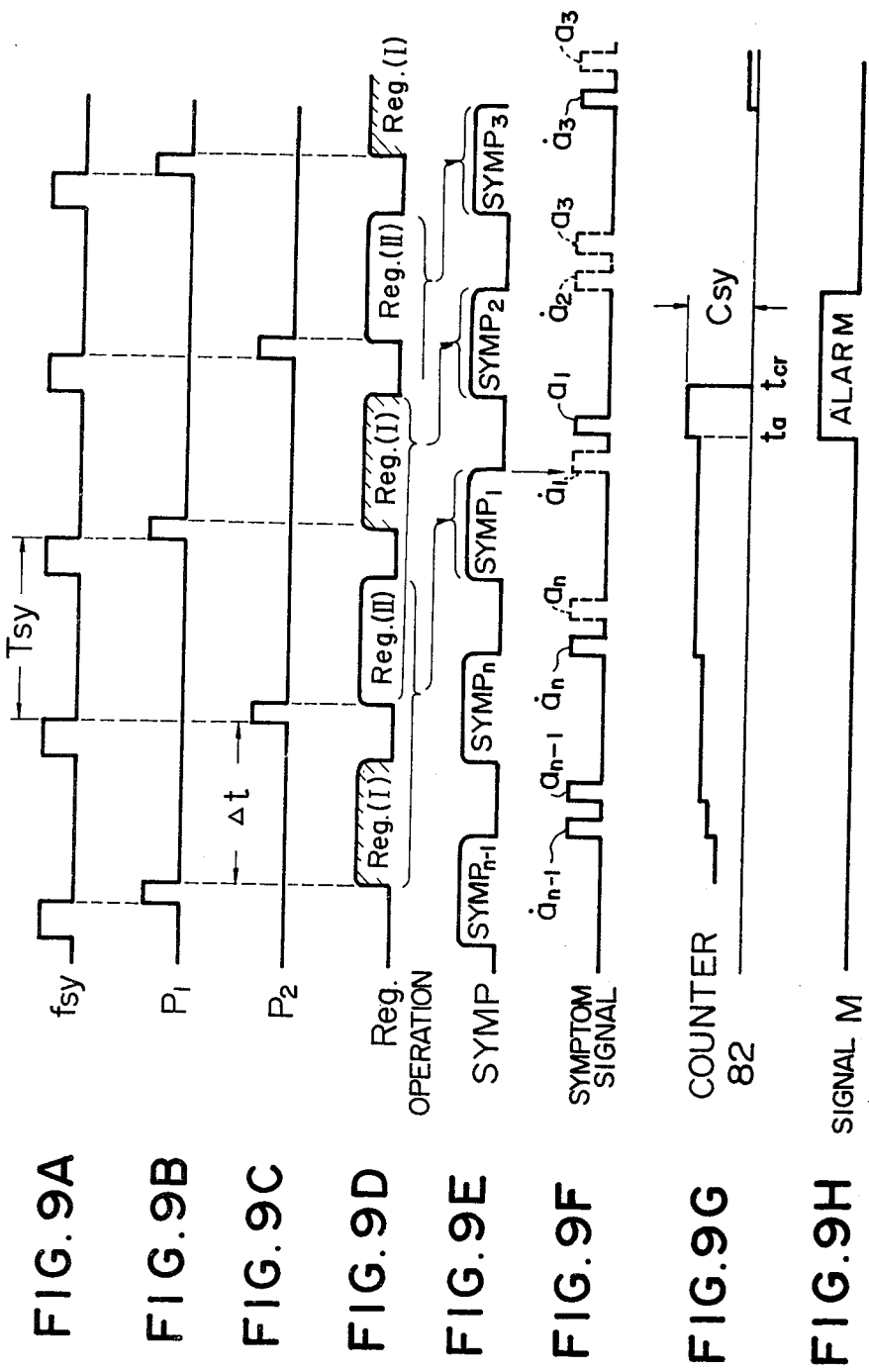

METHOD AND APPARATUS FOR SYMPTOM DIAGNOSIS BY MONITORING VIBRATION OF SHAFT OF ROTARY MACHINE

This invention relates to a method and apparatus for monitoring a vibrational characteristic of the shaft of a rotary machine such as a turbo-generator of large capacity composed of a steam turbine and a generator installed in a thermo-electric or atomic power plant.

With the increase in the capacity of a rotary machine of the kind above described, monitoring of vibration of the shaft of the rotary machine becomes more and more important from the aspects of machine operation and maintenance. In a steam turbine of large capacity, for example, the phase of its shaft vibration tends to become more and more complex due to the various factors including the increased weight of the rotor, the increased center-to-center distance of the bearings and the increased number of the turbine casings. Further, because of the recent tendency that such a rotary machine is more frequently started and stopped to meet varying power demand than the past, the possibility of occurrence of unusual shaft vibration attributable to, for example, a thermal unbalance is greater than when the rotary machine continues to operate under the steady condition. Therefore, a machine operator continually pays his attention to the operating state of the rotary machine, especially, in the starting stage of the rotary machine, because he must timely deal with unusual vibration of the shaft if it occurs.

The present invention concerns with the art of monitoring shaft vibration of such a rotary machine so that the machine operator can make a quick response to unusual vibration of the shaft if it occurs. In the present invention, a symptom of unusual operation of the rotary machine is continuously diagnosed even when the rotary machine is operating steadily with the amplitude of shaft vibration or the rate of change of the amplitude being maintained within the so-called safety region, so that the result of symptom diagnosis can be quickly made use of as a guidance for ensuring the safety of the rotary machine.

A method commonly used hitherto for ensuring the safety of a rotary machine comprises continuously monitoring the amplitude itself of detected vibration of the shaft and generating an alarm signal as soon as the vibration amplitude exceeds a predetermined setting. This is a simplest method and is widely used in this field.

There is another method in which Fourier analysis is made on a vibrating waveform to extract a power spectrum of the waveform, as disclosed in, for example, U.S. Pat. No. 3,694,637 entitled "Method and Apparatus for Detecting Tool Wear" and issued on Sept. 26, 1972. According to the disclosure of the above patent, the detected power spectrum is compared with a reference power spectrum to estimate the time of replacement of a tool subjected to wear, and an improvement in the accuracy of monitoring is expected compared with the aforementioned method which relies upon only monitoring of the amplitude of the detected shaft vibration signal.

There is still another method disclosed in, for example, Japanese Patent Laid-Open No. 54-111871 (corresponding to U.S. patent application Ser. No. 013,820 filed on Feb. 22, 1979) assigned to the assignee of the present patent application. According to the method disclosed in the above patent application, a signal indicative of detected vibration of the shaft of a rotary machine is analyzed with respect to the machine's rotation frequency component and other frequency components having predetermined relationships with the former, and the results of analysis are used together with predetermined operation patterns for controlling the operation of the rotary machine. The method, in which the detected shaft vibration signal is subjected to digital analysis, is featured by the fact that the accuracy of monitoring can be improved over that based on monitoring of an analog signal and that the method is applied to the control of the operation of a rotary machine.

Although all of these prior art disclosures are adapted to make monitoring of the amplitude of shaft vibration or monitoring of the machine's rotation frequency and associated frequency components, monitoring of the machine operation within the so-called safety region is not especially taken into consideration in the prior art disclosures.

It is an object of the present invention to provide a method and apparatus for diagnosing a symptom of unusual operation of a rotary machine on the basis of a signal indicative of detected vibration of the shaft of the rotary machine.

Another object of the present invention is to provide a method and apparatus of the above character in which such a symptom is diagnosed at a safety level of the detected shaft vibration signal used for the control of the operation of the rotary machine so as to provide operation data which can be utilized more adequately as information required for the machine operation control purpose.

The method and apparatus according to the present invention is featured by the fact that, in a stage in which a signal indicative of detected vibration of the shaft of a rotary machine has a level lower than an alarm level and, therefore, the detected signal level lies within a safety region, a symptom of unusual operation of the rotary machine is diagnosed by detecting subsequent changes in the amplitude of the shaft vibration signal.

Another feature of the present invention resides in the fact that the symptom of unusual operation of the rotary machine is diagnosed on the basis of the amplitude of the detected shaft vibration signal and the rate of change of the vibration amplitude.

Still another feature of the present invention resides in the fact that a symptom diagnostic level at a given time is set on the basis of the amplitude of the shaft vibration and the rate of change of the vibration amplitude detected at that time, and the symptom of unusual operation of the rotary machine is diagnosed by comparing the signal level detected at the next time with the setting of the symptom diagnostic level.

Yet another feature of the present invention resides in the fact that the amplitude of the detected shaft vibration signal and the rate of change of the vibration amplitude are selected to be equal to each other thereby defining a circular region for the symptom diagnosis, and the symptom of unusual operation of the rotary machine is diagnosed by detecting whether or not the signal amplitude and the rate of change of the signal amplitude lie inside or outside of this circular symptom diagnostic region.

In accordance with the present invention, there is provided a method of symptom diagnosis by continuously detecting vibration of the shaft of a rotary machine and monitoring a signal indicative of the detected shaft vibration for the diagnosis of the operating condition of the rotary machine, the method comprising:

establishing a predetermined safety region in which the detected shaft vibration signal is indicative of a relatively low level permitting continuous operation of the rotary machine;

monitoring the behaviour of the detected shaft vibration signal within the safety region; and diagnosing a symptom of unusual operation of the rotary machine on the basis of the result of monitoring of the behaviour of the detected shaft vibration signal within the safety region.

Other objects, features and advantages of the present invention will become apparent from the following detailed description of preferred embodiments thereof taken in conjunction with the accompanying drawings, in which:

FIGS. 9A to 9H show a timing chart illustrating the operation of the symptom diagnostic unit 30 shown in FIG. 7A;

Before describing the present invention in detail, the structure of a rotary machine to which the present invention is applied, a transducer transducing vibration of the shaft of the rotary machine, and pulse generators will be briefly described with reference to FIGS. 1A, 1B and 1C.

Figure 1A:
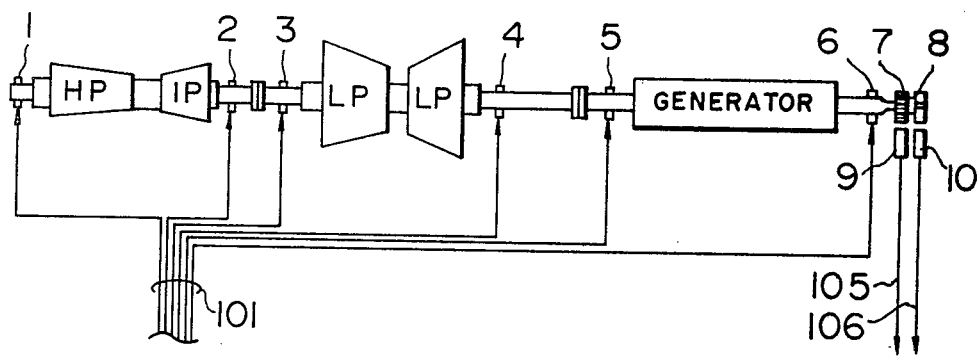
FIG. 1A is a schematic front elevation view of a rotary machine for which the shaft vibration is to be monitored.
Figure 1B:
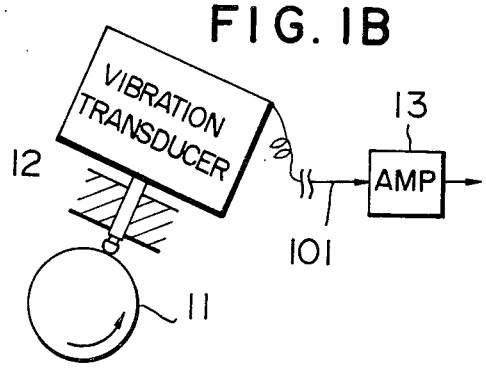
FIG. 1B shows a shaft vibration transducer mounted on each of the bearings in the rotary machine shown in FIG. 1A.
Figure 1C:
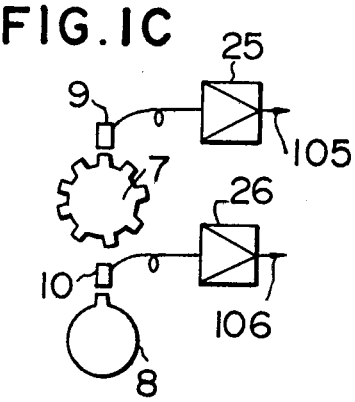
FIG. 1C is a schematic view showing the structure of a reference pulse generator and a rotation speed-responsive pulse generator.

Referring to FIG. 1A, the rotor shaft of the rotary machine is journalled in bearings 1 to 6. The rotary machine includes a high-pressure turbine HP, an intermediate-pressure turbine IP and a low-pressure turbine LP driving a generator. A vibration transducer 12 as shown in FIG. 1B is mounted on each of the bearings 1 to 6. Referring to FIG. 1B, the vibration transducer 12 engages with the rotor shaft 11 of the rotary machine to transduce vibration of the rotor shaft 11 into an electrical signal 101 indicative of vibration of the rotor shaft 11, and an amplifier 13 amplifies the detected shaft vibration signal 101. Referring to FIG. 1C, a reference pulse generator includes a gear 7 mounted on one end of the rotor shaft 11, an associated electromagnetic pickup 9 and an amplifier 25 connected to the pickup 9 to provide a reference pulse signal 105, and a rotation-speed responsive pulse generator includes a gear 8 mounted also on one end of the rotor shaft 11, an associated electromagnetic pickup 10 and an amplifier 26 connected to the pickup 10 to provide a rotation speed-responsive pulse signal 106. The former pulse generator generates a predetermined number of pulses per revolution of the rotor shaft 11, while the latter generates one pulse per revolution of the rotor shaft 11. It is generally convenient that the former pulse generator generates 60 pulses per revolution of the rotor shaft 11.

Figure 2:
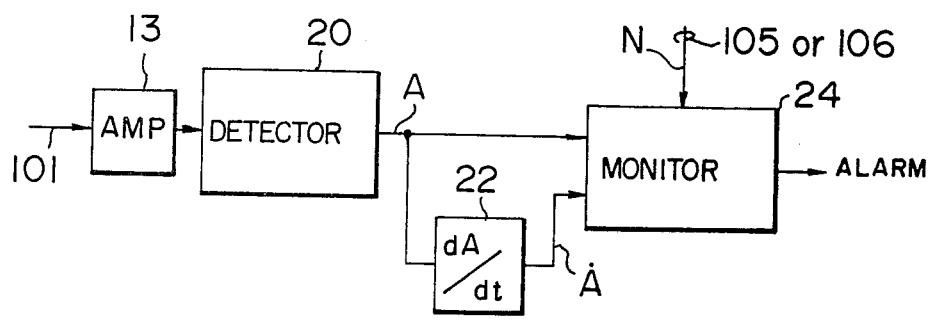
FIG. 2 is a block diagram of a shaft vibration monitoring system.

FIG. 2 is a block diagram of one form of a system preferably used for monitoring the transducer output signal 101 indicative of vibration of the associated portion of the rotor shaft 11. Referring to FIG. 2, the detected shaft vibration signal 101 is applied through the amplifier 13 to a detector circuit 20 which provides an output signal (a DC component signal) indicative of the average value of the amplitude A of the input signal 101. The detector output signal indicative of the vibration amplitude A is applied to a monitoring circuit 24 and to a differentiating circuit 22 which provides an output signal indicative of the rate of change $\dot{A}$ of the vibration amplitude. The pulse signal 105 or 106 indicative of the rotation speed N of the rotary machine is also applied from the pulse generator to the monitoring circuit 24. The signal 105 or 106 may, however, be any one of other signals proportional to the rotation speed of the rotary machine.

Figure 3A:
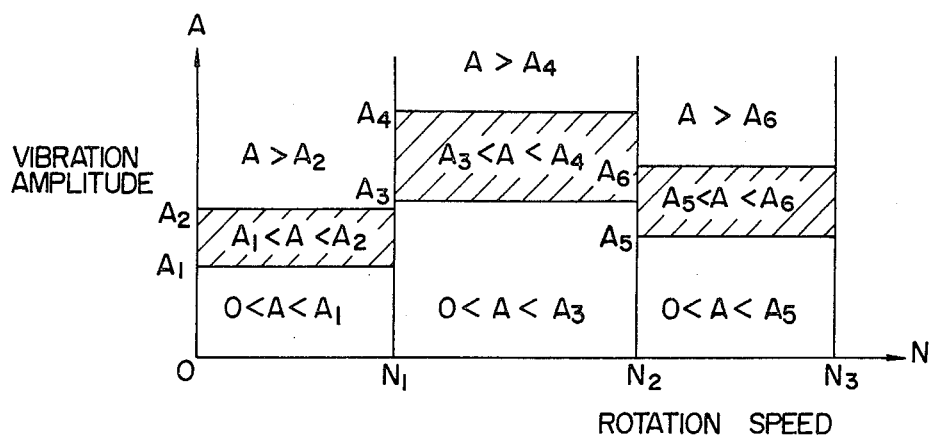
FIG. 3A illustrates the relation among a safety region, an alarm region and a trip region when the rotation speed of the rotary machine is divided into a plurality of ranges.
Figure 3B:
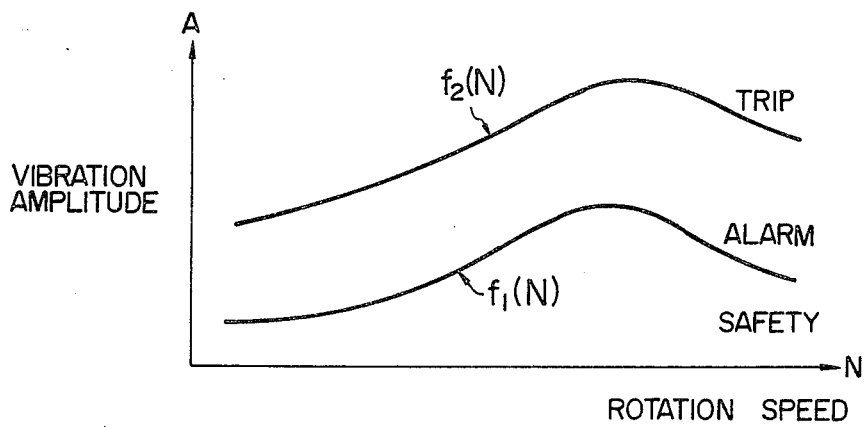
FIG. 3B illustrates the corresponding regions of FIG. 3A divided depending on the rotation speed of the rotary machine.

A method as illustrated in FIG. 3A has been proposed so as to diagnose unusual vibration of the rotor shaft 11 of the rotary machine on the basis of the relation between the vibration amplitude A and the rotation speed N of the rotary machine. Referring to FIG. 3A, there are shown an alarm region, a trip region and a safety region related to the rotation speed N of the rotary machine. In the alarm region, the relations $A_1 < A < A_2$, $A_3 < A < A_4$ and $A_5 < A < A_6$ hold when the rotation speed N lies within the ranges of $0 < N < N_1$, $N_1 < N < N_2$ and $N_2 < N < N_3$ respectively. In the trip region, the relations $A_2 < A$, $A_4 < A$ and $A_6 < A$ hold when the rotation speed N lies within the above ranges respectively. In the safety region, the relations $0 < A < A_1$, $0 < A < A_3$ and $0 < A < A_5$ hold when the rotation speed N lies within the above ranges respectively. Besides the above method of monitoring the shaft vibration by dividing the rotation speed range into a plurality of ranges as shown in FIG. 3A, there is another method in which the shaft vibration is monitored on the basis of continuous functions $f_1(N)$ and $f_2(N)$ of the rotation speed N of the rotary machine. In FIG. 3B, the relation $f_1(N) < A < f_2(N)$ holds in an alarm region, the relation $f_2(N) < A$ holds in a trip region, and the relation $A < f_1(N)$ holds in a safety region. In each of these prior art methods, no monitoring is done on the behaviour of the amplitude of vibration lying within the safety region. The prior art methods are therefore defective in that a predictive diagnosis of a symptom of unusual operation of the rotary machine cannot be expected although such a symptom may have already appeared in the safety region.

The present invention contemplates to make an adequate diagnosis of the operating condition of the rotary machine by quickly detecting appearance of a symptom of unusual operation of the rotary machine in the safety region.

More precisely, the present invention is featured by the fact that the state of vibration of the rotor shaft of the rotary machine is monitored while the amplitude of vibration lies still within the safety region by establishing a safety behavior region within the safety region on the basis of the present status of the amplitude of vibration and the rate of change of the amplitude of vibration, renewing the safety behaviour region in response to a change of the status of the amplitude of vibration and the rate of change of the vibration amplitude, and detecting appearance of a symptom of unusual operation of the rotary machine when the amplitude of vibration and/or the rate of change of the vibration amplitude exceed the individual values of the safety behaviour region.

Figure 4:
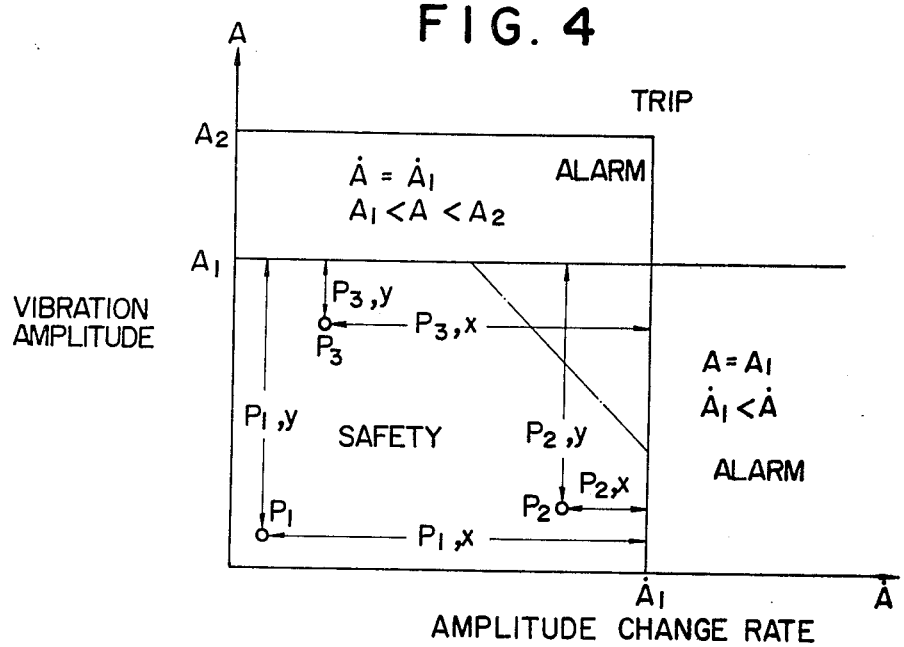
FIG. 4 illustrates margins of various points in the safety region relative to the alarm region.

Describing in further detail, the safety region is commonly determined on the basis of the relation between the vibration amplitude A and the rate of change of the vibration amplitude $\dot{A}$ in a manner as shown in FIG. 4. It will be seen in FIG. 4 that the relations $\dot{A} < \dot{A}_1$ and $A < A_1$ hold in the safety region. Consider now a point $P_1$ in the safety region. There are margins of $P_{1,x}$ in the vibration amplitude change rate $\dot{A}$ and $P_{1,y}$ in the vibration amplitude A until the point $P_1$ moves out into the alarm region from the safety region. On the other hand, in the case of another point $P_2$ lying also within the safety region, it has a margin of $P_{2,x}$ in the vibration amplitude change rate $\dot{A}$ and a margin of $P_{2,y}$ in the vibration amplitude A. Similarly, in the case of still another point $P_3$ lying within the safety region, it has a margin of $P_{3,x}$ in the vibration amplitude change rate $\dot{A}$ and a margin of $P_{3,y}$ in the vibration amplitude A. It will be seen that the margin $P_{2,y}$ is larger than the margin $P_{2,x}$ in the case of the point $P_2$, while the margin $P_{3,x}$ is larger than the margin $P_{3,y}$ in the case of the point $P_3$. Thus, in the case of the point $P_3$, it has been considered that an abrupt change in the vibration amplitude change rate $\dot{A}$ will not move the point $P_3$ out of the safety region and the point $P_3$ will still remain within the safety region. Similarly, in the case of the point $P_2$, it has been considered that an abrupt change in the vibration amplitude A will not move the point $P_2$ out of the safety region and the point $P_2$ will still remain within the safety region. There have thus been no means for recognizing such a status, and these points have been judged to remain within the safety region in spite of a possible abrupt change in the status. It has therefore been impossible to recognize future behaviour of these points lying within the safety region.

Figure 5:
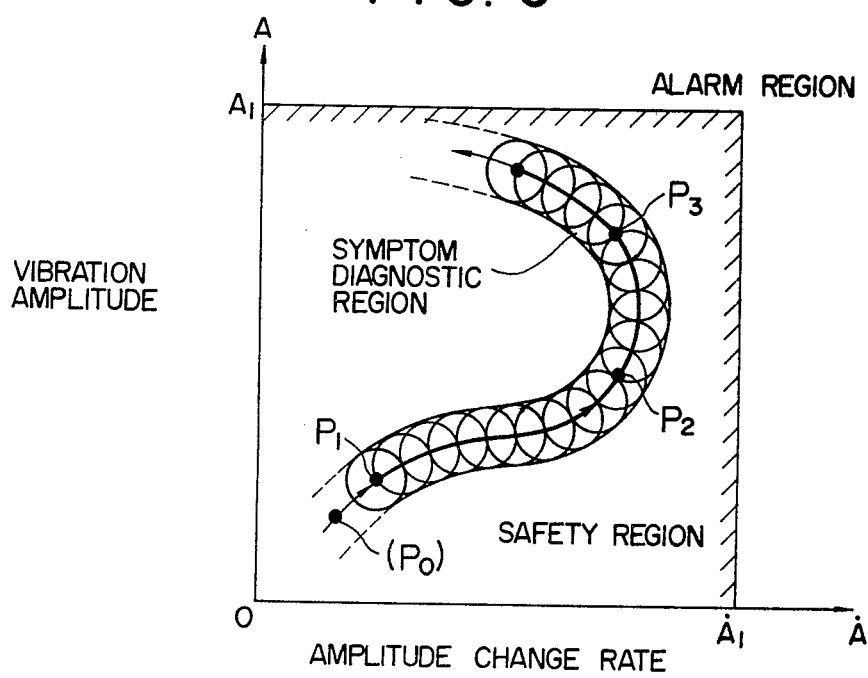
FIG. 5 illustrates the locus of a symptom diagnostic region renewed at time intervals of a predetermined symptom diagnostic period.

The present invention contemplates to detect a symptom of unusual operation of the rotary machine while the points lie still within the safety region. FIG. 5 shows schematically the basic concept of the present invention for detecting a symptom of unusual operation of the rotary machine by recognizing future behaviour of the points $P_1$, $P_2$ and $P_3$. Referring to FIG. 5, symptom diagnostic regions for the individual points $P_1$, $P_2$ and $P_3$ are established within the safety region, and appearance of a symptom of unusual operation of the rotary machine is predicted or estimated when any one of the points $P_1$, $P_2$ and $P_3$ moves out of its symptom diagnostic region. In FIG. 5, these regions are shown concentric with respect to the individual points $P_1$, $P_2$ and $P_3$.

Figure 6:
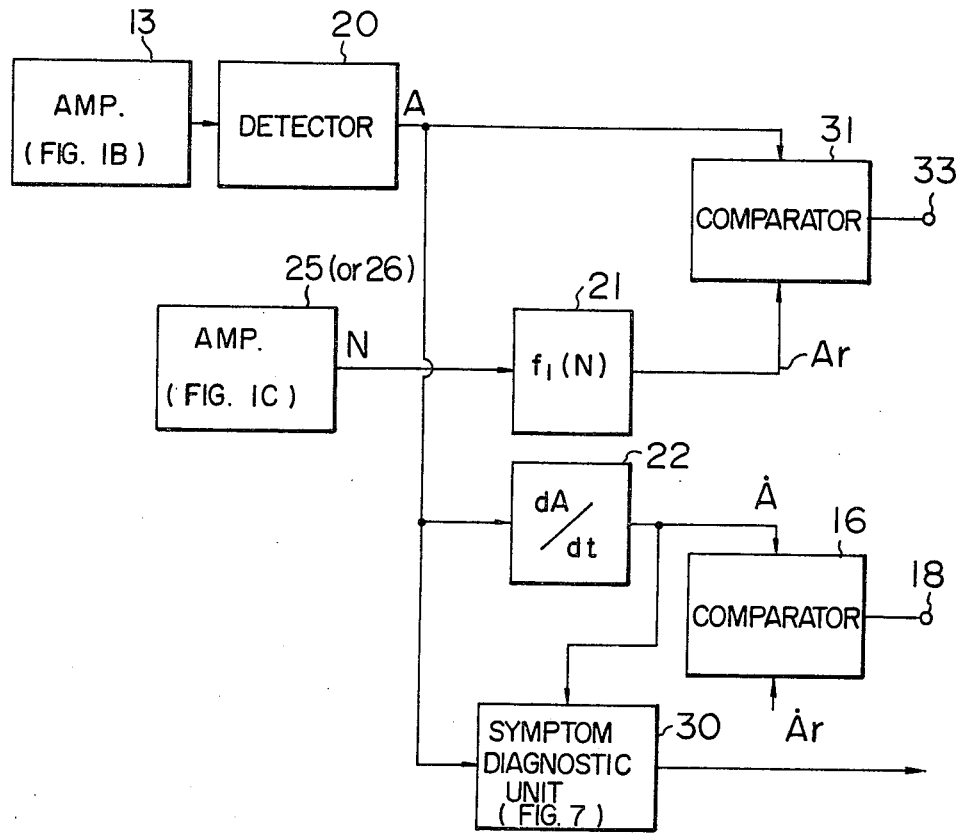
FIG. 6 is a block diagram of a shaft vibration monitoring system including the parts embodying the method according to the present invention.

FIG. 6 is a block diagram showing the general structure of a shaft vibration monitoring system including the parts embodying the method according to the present invention. Referring to FIG. 6, a detector circuit 20 corresponds to that shown in FIG. 2, and a shaft vibration signal 101 is applied thereto from the vibration transducer 12 shown in FIG. 1B. A pulse generator 23 corresponds to that shown in FIG. 1C. A function generator 21 generates an output signal $A_r$ indicative of a function $f_1(N)$ of the rotation speed N of the rotary machine in response to the application of the pulse signal from the rotation speed-responsive pulse generator. A differentiation (dA/dt) circuit 22 corresponding to that shown in FIG. 2 generates an output signal indicative of the vibration amplitude change rate $\dot{A}$. A first level comparator 31 compares the level of the output signal of the detector circuit 20 indicative of the detected vibration amplitude A with that of the output signal $A_r$ of the function generator 21 and generates an alarm signal or a trip signal 33 when the relation $A > A_r$ holds. A second level comparator 16 compares the level of the output signal of the differentiator 22 indicative of the detected vibration amplitude change rate $\dot{A}$ with a predetermined setting $\dot{A}_r$ of the vibration amplitude change rate $\dot{A}$ and generates an alarm signal 18 when the relation $\dot{A} > \dot{A}_r$ holds. Thus, both of the vibration amplitude A and its change rate $\dot{A}$ are monitored at the same time. Such an arrangement is, however, still insufficient in that nothing is done until the level of the setting $A_r$ or $\dot{A}_r$ is reached.

Figure 7A:
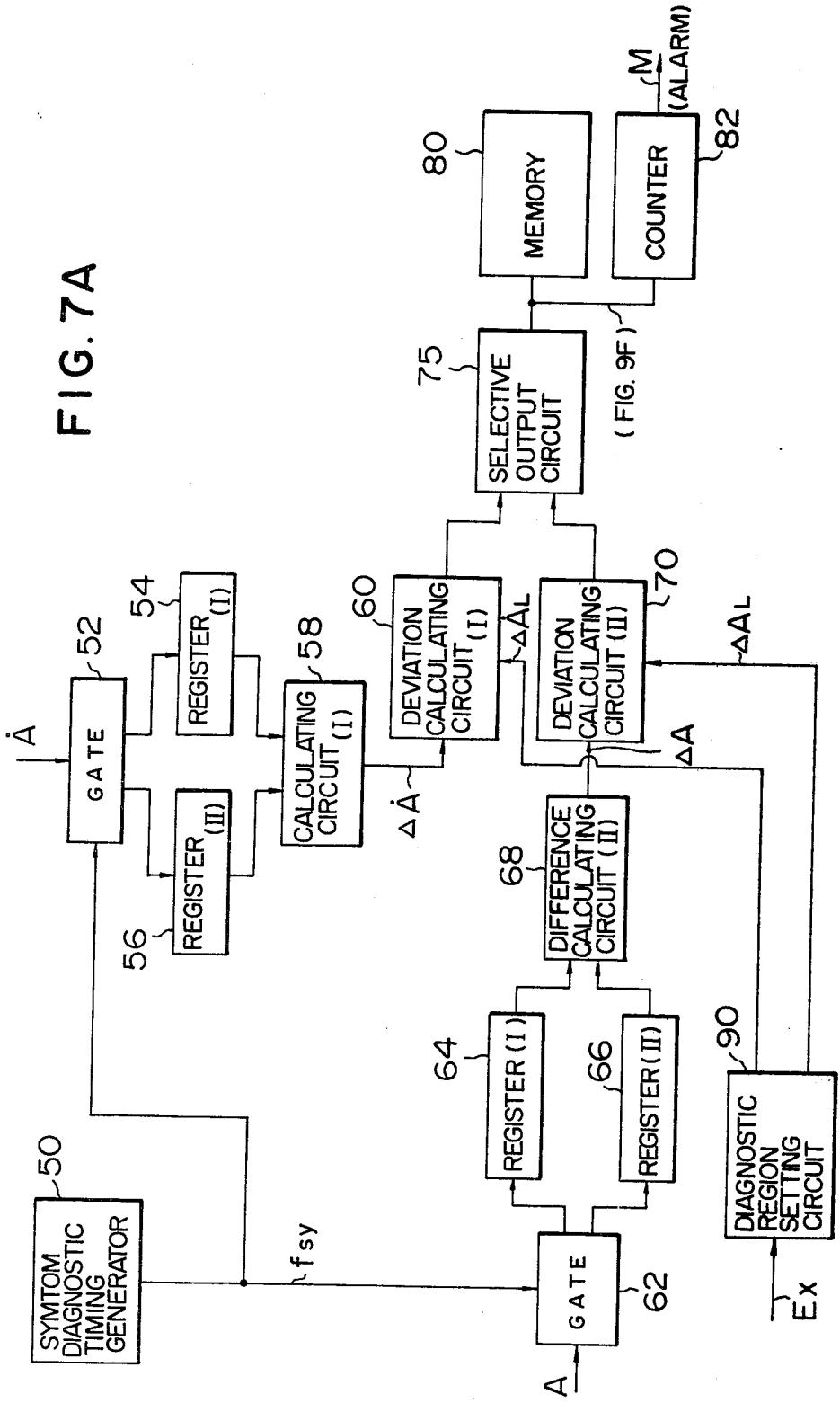
FIG. 7A shows the detailed structure of the symptom diagnostic unit 30 shown in FIG. 6 and embodying the feature of the present invention.

A symptom diagnostic unit 30 is the characteristic part of the present invention. FIG. 7A shows the detailed structure of one form of the symptom diagnostic unit 30, and FIG. 8 illustrates the basic principle of symptom diagnosis according to the present invention.

Suppose now that $P_o(\dot{A}_o, A_o)$ is the monitored point determined from the values of $\dot{A}$ and A lying within the safety region. Suppose then that allowable changes of $\dot{A}$ and A at the point $P_o$ subjected to the symptom diagnosis are set at $\Delta \dot{A}_L$ and $\Delta A_L$. The symptom diagnostic region S at that time is expressed by the following equation (1):

$$\frac{(\dot{A} - \dot{A}_o)^2}{\Delta \dot{A}_L{}^2} + \frac{(A - A_o)^2}{\Delta A_L{}^2} = 1 \tag{1}$$

Figure 8:
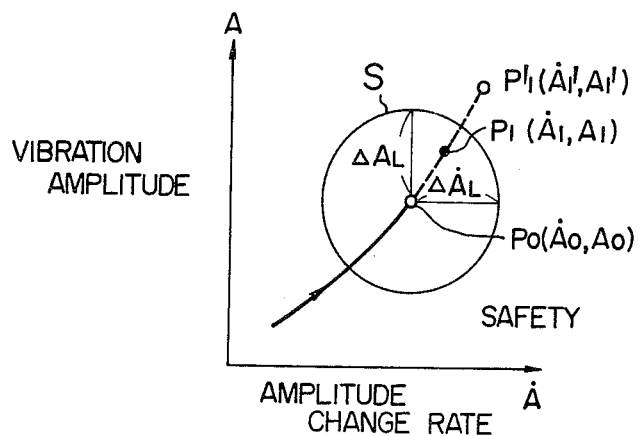
FIG. 8 illustrates the symptom diagnostic region established according to the present invention.

The symptom diagnostic region S is circular as shown in FIG. 8 when $\Delta \dot{A}_L$ and $\Delta A_L$ are selected to be $\Delta \dot{A}_L = \Delta A_L$. Since $\Delta \dot{A}_L$ and $\Delta A_L$ represent increments of $\dot{A}$ and A respectively during the symptom diagnostic period $\Delta t$, they can be expressed by the differences $\{\dot{A}(t+\Delta t) - \dot{A}(t)\}$ and $\{A(t+\Delta t) - A(t)\}$ respectively. When the point $P_o$ moves to the point $P_1$ lying also within the symptom diagnostic region S at the time $(t + \Delta t)$, that is, when the following expression $$P_1\{\dot{A}(t+\Delta t), A(t+\Delta t)\} \in S \tag{2}$$

holds, a new symptom diagnostic region S is established by selecting this point $P_1$ as a new origin. If the relation $P_1 \notin S$ holds, this proves appearance of a symptom of unusual operation of the rotary machine, and an unusual symptom signal is generated. In this manner, symptom diagnostic can be carried out even when the point P lies still within the safety region.

The detailed structure of the symptom diagnostic unit 30 according to the present invention will now be described with reference to FIG. 7A. The symptom diagnostic period $T_{sy}$ is provided by a symptom diagnostic timing signal ($f_{sy}$) generator 50. This symptom diagnostic period $T_{sy}$ provided by the symptom diagnostic timing signal generator 50 is selected independently of, for example, the sampling period for digital processing of the shaft vibration signal 101. The diagnostic timing is determined in relation to the symptom diagnostic region S (or $\Delta\dot{A}_L$ and $\Delta A_L$) described above. When the symptom diagnostic period $T_{sy}$ is excessively long, the significance of symptom diagnosis will be lost, while when it is excessively short, true symptom diagnosis may not be attained. Therefore, $T_{sy}$ (or $f_{sy}$) shown in FIG. 9A is determined depending on whether the symptom diagnosis is directed to the operating characteristic of the rotary machine under consideration or to the operating condition under acceleration of the rotary machine or to the steady operating condition of the rotary machine.

The data receiving pulse $f_{sy}$ shown in FIG. 9A is generated from the symptom diagnostic timing signal generator 50 in each symptom diagnostic period $T_{sy}$ to permit passage of data $\dot{A}$ and A through respective gate circuits 52 and 62. The data $\dot{A}$ and A are then applied to respective registers (I) 54 and (I) 64 in timed relation with a timing pulse $P_1$ shown in FIG. 9B, and the next data $\dot{A}$ and A are applied to respective registers (II) 56 and (II) 66 in timed relation with another timing pulse $P_2$ shown in FIG. 9C. FIG. 9D shows the timing of renewal of the data $\dot{A}$ and A registered in the respective registers (I) 54, 64 and (II) 56, 66. The term "renewal" indicates that the data $\dot{A}$ and A are sequentially alternately registered in the respective registers (I) 54, 64 and (II) 56, 66 so that newest data can be used for the purpose of symptom diagnosis. FIG. 9E shows how the symptom is diagnosed using the data $\dot{A}$ and A registered in the respective registers (I) and (II), and it will be seen that the symptom diagnosis is repeated as shown by the steps $SYMP_1$ to $SYMP_n$. For example, diagnostic calculation using the data $\dot{A}$ and A registered in the respective registers (I) and (II) is executed in the step $SYMP_1$, and in the next step $SYMP_2$, diagnostic calculation is executed using the data registered in the registers (II) and used already in the step $SYMP_1$ together with the new data registered now in the registers (I).

Referring to FIG. 7A again, the data $\dot{A}$ registered at time t in the register (I) 54 and the data $\dot{A}$ registered at time ($t+\Delta t$) in the register (II) 56 are applied to a difference calculating circuit (I) 58 which calculates the difference $\Delta\dot{A}$ between the inputs, and the calculated difference $\Delta\dot{A}$ is applied from the calculating circuit (I) 58 to a deviation calculating circuit (I) 60 which calculates a deviation of $\Delta\dot{A}$ from $\Delta\dot{A}_L$. The result of calculation is applied from the deviation calculating circuit (I) 60 to a selective output circuit 75. Similarly, the data A registered at time t in the register (I) 64 and the data A registered at time ($t+\Delta t$) in the register (II) 66 are applied to a difference calculating circuit (II) 68 which calculates the difference $\Delta A$ between the inputs, and the calculated difference $\Delta A$ is applied from the calculating circuit (II) 68 to a deviation calculating circuit (II) 70 which calculates a deviation of $\Delta A$ from $\Delta A_L$. The result of calculation is also applied from the deviation calculating circuit (II) 70 to the selective output circuit 75.

Therefore, the term "diagnostic calculation" referred to above is used to include the difference calculation executed in the difference calculating circuits (I) 58 and (II) 68, and the deviation calculation executed in the deviation calculating circuits (I) 60 and (II) 70 which apply the results of calculation to the selective output circuit 75. When, for example, the difference between the value of $\dot{A}$ detected at time ($t+\Delta t$) and that of $\dot{A}$ detected at time t does not exceed the value of $\Delta\dot{A}_L$, that is, when $$\dot{A}(t+\Delta t)-\dot{A}(t)<\Delta\dot{A}_L \qquad (3),$$

a symptom signal $\dot{a}_1$ as shown in FIG. 9F appears from the selective output circuit 75. When, similarly, the difference between the value of A detected at time ($t+\Delta t$) and that of A detected at time t exceeds the value of $\Delta A_L$, that is, when $$A(t+\Delta t)-A(t)>\Delta A_L \qquad (4),$$

a symptom signal $\dot{a}_1$ as also shown in FIG. 9F appears from the selective output circuit 75. It will be seen in FIG. 9F that an output signal from the selective output circuit 75 is shown by the solid waveform when the difference $\Delta\dot{A}$ or $\Delta A$ above described exceeds the setting defining the region S, and another output signal is shown by the dotted waveform when the difference $\Delta\dot{A}$ or $\Delta A$ does not exceed the setting defining the region S. Thus, the symptom signals $a_1, \dot{a}_3, \dot{a}_{n-1}, a_{n-1}$ and $a_n$ indicate that the setting is exceeded. These symptom signals are sequentially applied from the selective output circuit 75 to a memory 80 and to an accumulative counter 82 shown in FIG. 7A. These data are sequentially stored in the memory 80 to be utilized for the analysis of the operating condition of the rotary machine.

The accumulative counter 82 counts the symptom signals shown in FIG. 9F, and, when the count attains a predetermined setting $C_{sy}$, it generates an alarm signal M. FIG. 9G shows the progressive increase of the count of the counter 82 until the count attains the setting $C_{sy}$ at time $t_a$ at which the alarm signal M shown in FIG. 9H is generated. The counter 82 is reset at time $t_{cr}$ after counting the pulses for a predetermined period of time and is then set to start its counting operation again.

The values of $\Delta\dot{A}_L$ and $\Delta A_L$ defining the symptom diagnostic region S may be fixed. However, it is common practice that these values are suitably adjustable by a symptom diagnostic region setting circuit 90 shown in FIG. 7A. This symptom diagnostic region setting circuit 90 may be manually controlled for the purpose of manual setting of the values of $\Delta\dot{A}_L$ and $\Delta A_L$ or an external setting signal $E_x$ may be applied to this circuit 90 for suitably externally setting the values of $\Delta A_L$ and $\Delta A_L$.

Figure 7B:
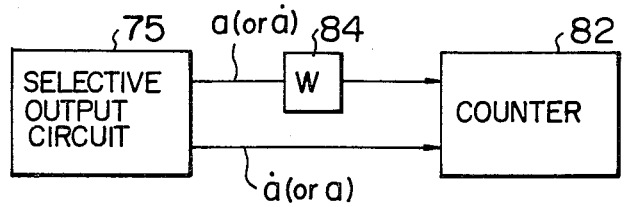
FIGS. 7B to 7E show partial modifications of the structure shown in FIG. 7A.

Although the counter 82 is adapted to make an accumulative counting operation as shown in FIG. 9G, the symptom signal $\dot{a}$ or $\underline{a}$ applied to the counter 82 may be suitably weighted, as, for example, shown in FIG. 7B. Referring to FIG. 7B, a weighting element 84 is disposed in a signal path extending between the selective output circuit 75 and the counter 82 to multiply the signal $\dot{a}$ or $\underline{a}$ by a suitable weight W. For this purpose, a coefficient unit of simple structure can be used. It is a matter of choice to multiply the signal a by the weight W or to multiply the signal á by the weight W.

Figure 7C:
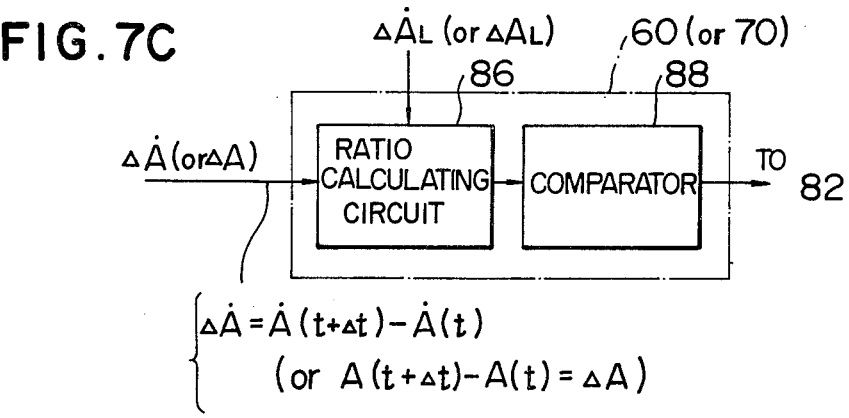

In the deviation calculating circuits (I) 60 and (II) 70, deviations of $\Delta \dot{A}$ from $\Delta \dot{A}_L$ and $\Delta A$ from $\Delta A_L$ are calculated. However, the ratios therebetween may be calculated by a circuit as, for example, shown in FIG. 7C. Referring to FIG. 7C, each of the circuits 60 and 70 is modified to include a ratio calculating circuit 86 and a comparator 88. The ratio calculating circuits 86 calculate the ratios $\Delta \dot{A}/\Delta \dot{A}_L$ and $\Delta A/\Delta A_L$ respectively, and each of the comparators 88 compares the result of calculation by the associated ratio calculating circuit 86 with unity. Therefore, when the result of comparison proves that $\Delta \dot{A}/\Delta \dot{A}_L \geq 1.0$ or $\Delta A/\Delta A_L \geq 1.0$, a symptom signal á or a as shown in FIG. 9F is applied to the counter 82.

Figure 10A:
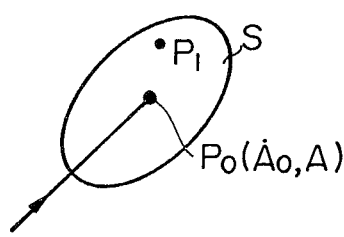
FIGS. 10A to 10C illustrate other forms of the symptom diagnostic region shown in FIG. 8.
Figure 10B:
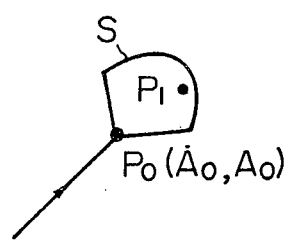

In the form shown in FIG. 8, the symptom diagnostic region S is defined to be a circle depicted around a point $P_0(\dot{A}_o, A_o)$. However, the shape of the symptom diagnostic region S is in no way limited to the circle shown in FIG. 8. Thus, the relation between $\Delta \dot{A}_L$ and $\Delta A_L$ may be $|\Delta \dot{A}_L| \neq |\Delta A_L|$. For example, the shape of the symptom diagnostic region S may be elliptical as shown in FIG. 10A. In such a case, it is effective to determine the shape of the region S in relation to the direction of progressive movement of the point P. The shape of the symptom diagnostic region S may be sectoral as shown in FIG. 10B. In such a case, judgment may be made as to whether $P_1 \in S$, and a symptom signal may be generated when $P_1 \notin S$.

Figure 10C:
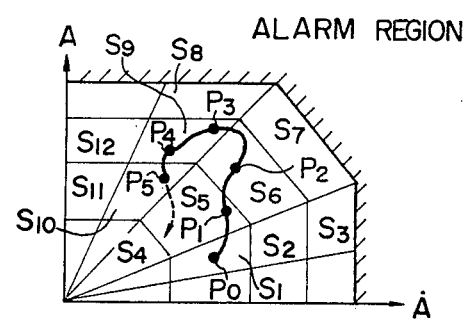

FIG. 10C shows that the progressive movement of point P from, for example, $P_0$ to $P_5$ is traced, and the safety region is divided into, for example, a plurality of small symtom diagnostic regions $S_1$ to $S_{12}$. When, for example, the result of symptom diagnosis at time intervals of the symptom diagnostic period $T_{sy}$ proves that the point P has progressively moved from $P_0$ to $P_5$ via $P_1$, $P_2$, $P_3$ and $P_4$ as shown in FIG. 10C, judgment is made as to how many such small symptom diagnostic regions have been passed until finally the point $P_5$ is reached. In the case of FIG. 10C, the number of the small symptom diagnostic regions through which the point P has passed is five. In the method of symptom diagnosis shown in FIG. 10C, the presence of a symptom of unusual operation of the rotary machine is diagnosed when the number of the small symptom diagnostic regions through which the point P has passed is larger than a predetermined setting. When such a number is smaller than the predetermined setting, the operating condition of the rotary machine is relatively stable, and the result of symptom diagnosis proves that there is no symptom of unusual operation of the rotary machine.

Figure 11A:
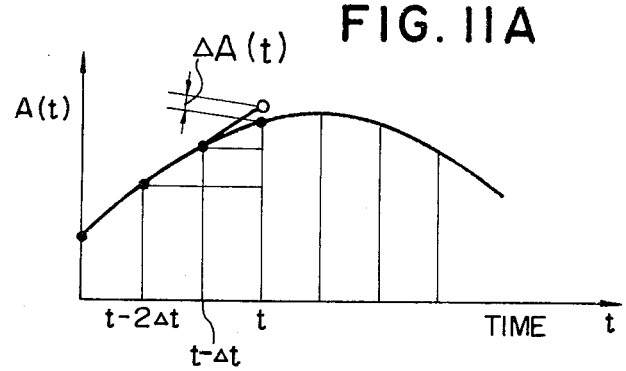
FIGS. 11A and 11B show another embodiment of the present invention adapted to perform a predictive symptom diagnosis.
Figure 11B:
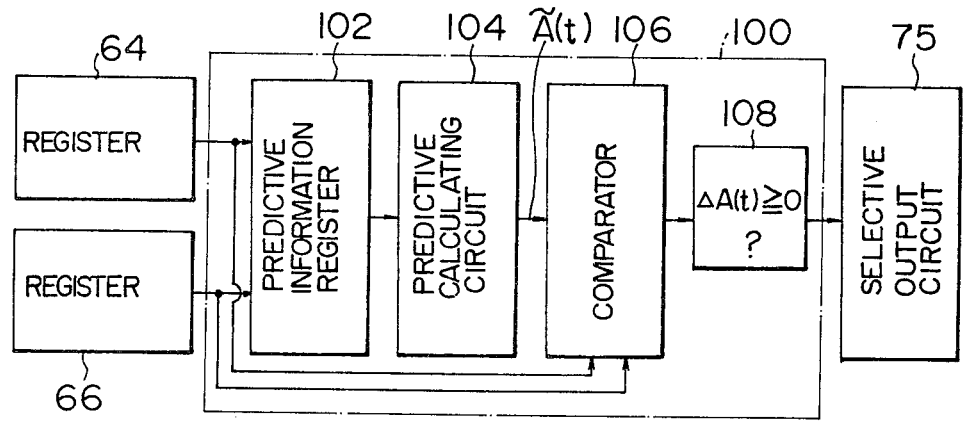

FIGS. 11A and 11B show another embodiment of the method according to the present invention. Referring to FIG. 11A, a vibration amplitude value $\tilde{A}(t)$ at time t is predicted or estimated on the basis of similar values $A(t-\Delta t)$ and $A(t-2\Delta t)$, and the deviation $\Delta A(t)$ of $\tilde{A}(t)$ from $A(t)$ is monitored. The following equation holds $$\Delta A(t) = A(t) - \tilde{A}(t) \qquad (5)$$
$$= A(t) - \{A(t-\Delta) + A(t-\Delta t) - A(t-2\Delta t)\}$$
$$= A(t) - 2A(t-\Delta t) + A(t-2\Delta t)$$

And, the presence of a symtom of unusual operation of the rotary machine is diagnosed when the following relation holds:

$$\Delta A(t) \geq 0 \qquad (6)$$

According to this method, the vibration amplitude value $\tilde{A}(t)$ at time t is estimated utilizing the data obtained at time $(t-\Delta t)$ and at time $(t-2\Delta t)$, and the presence of a symptom of unusual operation of the rotary machine is diagnosed when $\Delta A(t)$ is equal to or larger than 0. This method is thus effective for the diagnosis of the tendency of changing vibration.

In lieu of the method just described, a change of the vibration amplitude difference may be monitored. For example, the infinitesimal change $\Delta A'(t)$ of the vibration amplitude difference in FIG. 11A is given by $$\Delta A'(t) = \{A(t) - A(t-\Delta t)\} - \{A(t-\Delta t) - A(t-2\Delta t)\} \qquad (7)$$
$$= A(t) - 2A(t-\Delta t) + A(t-2\Delta t)$$

Therefore, $\Delta A'(t)$ can be estimated by linear approximation, and this manner of symptom diagnosis is as effective as that described with reference to FIG. 11A. The principle of symptom diagnosis above described applies also to $\dot{A}$. Herein, the method of symptom diagnosis on the detected vibration amplitude A will be described with reference to FIG. 11B, by way of example. Referring to FIG. 11B, a predictive symptom diagnostic unit 100 is connected at its inputs to the registers (I) 64 and (II) 66 and at its output to the selective output circuit 75 and includes a predictive information register 102 which stores a plurality of data required for the predictive symptom diagnosis. For the purpose of predictive symptom diagnosis of the vibration amplitude A described with reference to FIG. 11A, the register 102 may have a capacity of registering at least three data since $\tilde{A}(t)$ is estimated on the basis of the data $A(t-\Delta t)$ and $A(t-2\Delta t)$. The contents of the register 102 are sequentially renewed by the data sampled at time intervals of the symptom diagnostic period $T_{sy}$. A predictive calculating circuit 104 calculates the estimated vibration amplitude value $\tilde{A}(t)$ at time $t$ on the basis of the data $A(t-\Delta t)$ and $A(t-2\Delta t)$ registered in the register 102. A comparator 106 executes the calculation of $\Delta A(t)$ according to, for example, the equation (5), and an evaluating circuit 108 evaluates whether the relation $\Delta A(t) \geq 0$ shown in the expression (6) holds or not. The presence of a symptom of unusual operation of the rotary machine is diagnosed when the expression (6) is satisfied. In the case of the vibration amplitude change rate $\dot{A}$ too, a unit similar to that shown in FIG. 11B can be used for the purpose. In lieu of the evaluation of $\Delta A(t) \geq 0$ shown in the expression (6), the absolute value of $\Delta A(t)$ may be evaluated. For example, a predetermined reference value $\epsilon$ may be prepared, and evaluation may be made as to whether the relation $|\Delta A(t)| \geq \epsilon$ holds or not. This latter manner of evaluation is effective for the diagnosis of a symptom of shaft vibration tending to deviate from the estimated value.

Figure 7D:
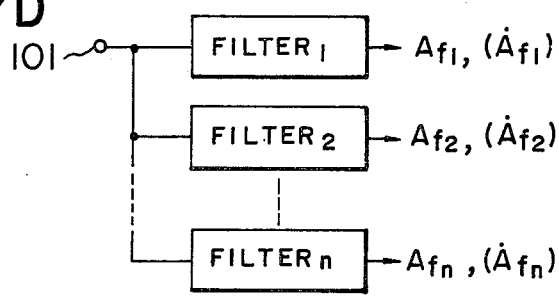

In a modification, a specific frequency component $f_B$ may be extracted from the shaft vibration signal 101, and the behaviour of a point lying in the safety region may be diagnosed according to a method similar to that described with reference to FIG. 8. For example, a plurality of filters $FILTER_1$ to $FILTER_n$ as shown in FIG. 7D may be provided to extract an amplitude $A_{fl}$ of frequency $f_1$, amplitude $A_{f2}$ of frequency $f_2$, ..., and amplitude $A_{fn}$ of frequency $f_n$ from the shaft vibration signal 101. In FIG. 7D, $\dot{A}_{f1}$ to $\dot{A}_{fn}$ represent the differentiated values of the amplitudes $A_{f1}$ to $A_{fn}$ respectively. In the case of symptom diagnosis on, for example, the frequency $f_2$, the symptom diagnosis is carried out on a set of $A_{f2}$ and $\dot{A}_{f2}$ according to a method similar to that described with reference to FIG. 8. The same applies to the other frequencies. This method is advantageous in that the shaft vibration can be continuously monitored even in the accelerating stage of the rotary machine when the specific frequencies are selected in relation to the frequency $f_R$ of rotation of the rotary machine. For example, it is convenient to select the frequency $f_1$ to be $f_1 = 2f_R$ (or $3f_R$), the frequency $f_2$ to be $f_2 = \frac{1}{2} \cdot f_R$ or $\frac{1}{3} \cdot f_R$ and so on.

Figure 7E:
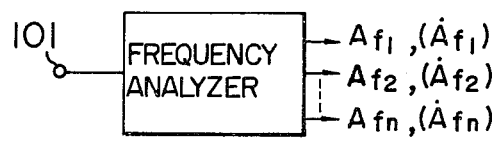

In a modification shown in FIG. 7E, a frequency analyzer is provided to extract such specific frequencies by digital frequency analysis, and symptom diagnosis is carried out in a manner entirely similar to that described above.

We claim:

1. A method of symptom diagnosis by continuously detecting vibration of the shaft of a rotary machine and monitoring a signal indicative of the detected shaft vibration for the diagnosis of the operating condition of the rotary machine, said method comprising:
 establishing a predetermined safety region in which said detected shaft vibration signal is indicative of a relatively low level permitting continuous operation of the rotary machine;
 monitoring the behaviour of said detected shaft vibration signal within said safety region; and
 determining the presence of a symptom of unusual operation of the rotary machine on the basis of the result of monitoring of the behaviour of said detected shaft vibration signal within said safety region.

2. A method of symptom diagnosis as claimed in claim 1, wherein said safety region is selected to be a region in which the vibration amplitude of said detected shaft vibration signal is smaller than a predetermined setting and the vibration amplitude change rate of said detected shaft vibration signal is also smaller than a predetermined setting.

3. A method of symptom diagnosis as claimed in claim 2, wherein said predetermined safety region is divided into a plurality of small symptom diagnostic regions, and a symptom of unusual operation of the rotary machine is determined on the basis of the number of said small symptom diagnostic regions through which the point representing said detected shaft vibration signal has progressively moved.

4. A method of symptom diagnosis as claimed in claim 1, wherein a symptom diagnostic period is previously set, and the behaviour of said detected shaft vibration signal within said safety region is monitored at time intervals of said symptom diagnostic period.

5. A method of symptom diagnosis as claimed in claim 4, wherein, upon completion of the symptom diagnosis in one of said symptom diagnostic periods, a new symptom diagnostic region for the symptom diagnosis in the next symptom diagnostic period is established, and the presence of a symptom of unusual operation of the rotary machine is determined when the level of said shaft vibration signal detected in the next symptom diagnostic period deviates from that of said symptom diagnostic region established in the preceding symptom diagnostic period.

6. A method of symptom diagnosis as claimed in claim 5, wherein said symptom diagnostic region in said next symptom diagnostic period is determined on the basis of the amplitude and the amplitude change rate of said detected shaft vibration signal, and the presence of a symptom of unusual operation of the rotary machine is determined when the level of said detected shaft vibration signal in said next symptom diagnostic region deviates from that of said symptom diagnostic region established in the preceding symptom diagnostic period.

7. A method of symptom diagnosis as claimed in claim 6, wherein the number of times the level of said detected shaft vibration signal deviates from that of the predetermined symptom diagnostic regions established at time intervals of said symptom diagnostic periods is counted by a counter and the presence of a symptom of unusual operation of the rotary machine is determined when the count of said counter exceeds a predetermined number.

8. A method of symptom diagnosis as claimed in claim 6, wherein, when the level of said detected shaft vibration signal deviates from that of the predetermined symptom diagnostic regions established at time intervals of said symptom diagnostic period due to level variations, one of said vibration amplitude and said vibration amplitude change rate is multiplied by a weight factor to modify the value thereof with respect to the predetermined symptom diagnostic regions, and the number of deviations is counted by a counter.

9. A method of symptom diagnosis as claimed in claim 5, wherein the level of said shaft vibration signal to be detected in said next symptom diagnostic period is estimated, and the presence of a symptom of unusual operation of the rotary machine is determined when the level of said shaft vibration signal detected in said next symptom diagnostic period exceed the estimated level.

10. A method of symptom diagnosis as claimed in claim 1, wherein the behaviour of, a specific frequency component of said detected shaft vibration signal is continuously monitored for the determination of a symptom of unusual operation of the rotary machine.

11. A method of symptom diagnosis as claimed in claim 10, wherein said specific frequency component has a predetermined relation with the rotation frequency of the rotary machine, and its behaviour is continuously monitored for the determination of a symptom of unusual operation of the rotary machine.

12. A method of diagnosing an unusual symptom of operation of a rotary machine in a region of safe operation wherein a signal indicative of shaft vibration of the rotary machine is monitored and in the region of safe operation an amplitude value of the shaft vibration signal is smaller than a predetermined value, and an amplitude change rate of the shaft vibration signal is smaller than a predetermined value, the method comprising the steps of:
 detecting at least one of the amplitude value of the shaft vibration signal and the amplitude change rate value of the shaft vibration signal, at a predetermined diagnosing period,
 setting and memorizing at least one of absolute values of a predetermined change from the amplitude value and the amplitude change rate value of said shaft vibration signal respectively, based upon the values therefor detected at the nth diagnosing period, for the purpose of using the absolute values as reference values for determining whether an unusual symptom is present at the (n+1)th diagnosing period, calculating the absolute values of deviations between at least one of the amplitude value and the amplitude change rate value thereof of the shaft vibration signal at the (n+1)th diagnosing period, and at least one of the amplitude value and the amplitude change rate value thereof of the shaft vibration signal at the nth diagnosing period respectively, determining the presence of a symptom of unusual operation of said rotary machine in the safe operation region when at least one of the calculated variations exceeds the set and memorized values of the reference values.

13. A method of diagnosing an unusual symptom as claimed in claim 12, further comprising the steps of:

setting the safe operation region of the rotary machine in accordance with an amplitude value and amplitude change rate value of the detected shaft vibration signal;

setting and memorizing a system diagnostic region including the detected values of said shaft vibration signal at the nth diagnosing period for the purpose of using it as reference values for determining whether an unusual symptom is present at the (n+1)th diagnosing period, and determining the presence of a symptom of unusual operation of the rotary machine when at least one value of the shaft vibration signal of the rotary machine detected at the (n+1)th unusual symptom diagnosing period falls outside the symptom diagnostic region.

14. A method of diagnosing an unusual symptom as claimed in claim 13, wherein the safe operation region is divided into a plurality of small symptom diagnostic regions, and a symptom of unusual operation of the rotary machine is determined on the basis of the number of the small symptom diagnostic regions through which a point representing the detected shaft vibration signal has progressively moved.

15. A method of diagnosing an unusual symptom as claimed in claim 13, wherein the number of times the value of the detected shaft vibration signal deviates from that of predetermined symptom diagnostic regions established at time intervals of said symptom diagnostic periods is counted by a counter and the presence of a symptom of unusual operation of the rotary machine is determined when the count of the counter exceeds a predetermined number.

16. A method of diagnosing an unusual symptom as claimed in claim 13, wherein when the value of the detected shaft vibration signal deviates from that of predetermined symptom diagnostic regions established at time intervals of said symptom diagnostic period due to value variations one of said vibration amplitude value and said vibration amplitude change rate value is multiplied by a weight factor for modifying the value with respect to the predetermined system diagnostic regions, and the number of deviations of the vibration signal as modified as counted by a counter.

17. A method of diagnosing an unusual symptom as claimed in claim 12, further comprising the steps of:

detecting a specific frequency component of the detected shaft vibration signal; and determining the presence of a symptom of unusual operation of the rotary machine when the value of specific frequency component exceeds a predetermined value of change.

18. A method of diagnosing an unusual symptom as claimed in claim 17, wherein the specific frequency component has a predetermined relation with the rotation frequency of the rotary machine, and continuously monitoring the behavior of the specific frequency component for determining a symptom of unusual operation of the rotary machine.

19. An apparatus for diagnosing an unusual symptom during safe operation of a rotary machine by detecting and monitoring a shaft vibration signal due to the rotation of said rotary machine, the apparatus comprising:

timing signal generating means for generating timing signals for delimiting unusual symptom diagnosing periods during the safe operation of said rotary machine;

first and second means for detecting and memorizing an amplitude value of said shaft vibration signal in response to timing signals at the nth and (n+1)th unusual symptom diagnosing periods;

third and fourth means for detecting and memorizing a value of the change rate of the amplitude of said shaft vibration signal in response to timing signals at the nth and (n+1)th unusual symptom diagnosing periods;

determination-reference memory means for setting and memorizing a change of the detected amplitude value and a change of the detected change rate of the amplitude value of said shaft vibration signal in the nth unusual symptom diagnosing period as determination reference values for the unusual symptom diagnosis at the (n+1)th unusual symptom diagnosing period;

first calculating means for calculating the difference between the values memorized in said first and second memory means;

second calculating means for calculating the difference between the values memorized in said third and fourth memory means;

first comparing means for comparing the calculation results fo said first calculation means with the value of the change of the amplitude value memorized in said determination-reference memory means;

second comparing means for comparing the calculation results of said second calculation means with the value of the change of the change rate of the amplitude value memorized in said determination-reference memory means; and means for determining the presence of a symptom of unusual operation of the rotary machine when at least one of said first and second comparing means provides an output indicative of the calculation result exceeding the value of the change set in said determination-reference memory means.

20. An apparatus as claimed in claim 19, wherein said means for determining the presence of a symptom of unusual operation includes counter means for counting the number of times at least one of said first and second comparing means provides an output during the safe operation of said rotary machine, said counter means generating an alarm signal when the count value exceed a predetermined number.

21. An apparatus as claimed in claim 20, further comprising weighting means arranged for modifying the output of at least one of said first and second comparing means to change the value of the output for counting by said counting means.

* * * * *